US009404380B2

(12) United States Patent
Welch et al.

(10) Patent No.: US 9,404,380 B2
(45) Date of Patent: Aug. 2, 2016

(54) TURBINE THERMAL CLEARANCE MANAGEMENT SYSTEM

(71) Applicant: General Electric Company, Schenectady, NY (US)

(72) Inventors: David Ernest Welch, Amsterdam, NY (US); Wojciech Grzeszczak, Warsaw (PL)

(73) Assignee: General Electric Company, Schenectady, NY (US)

( * ) Notice: Subject to any disclaimer, the term of this patent is extended or adjusted under 35 U.S.C. 154(b) by 543 days.

(21) Appl. No.: 13/904,579

(22) Filed: May 29, 2013

(65) Prior Publication Data
US 2014/0321984 A1    Oct. 30, 2014

(30) Foreign Application Priority Data
Apr. 30, 2013  (PL) .......................................... 403738

(51) Int. Cl.
*F01D 11/24* (2006.01)
(52) U.S. Cl.
CPC ............ *F01D 11/24* (2013.01); *F05D 2220/31* (2013.01); *F05D 2220/74* (2013.01); *F05D 2270/303* (2013.01); *F05D 2270/80* (2013.01); *Y02E 20/16* (2013.01)
(58) Field of Classification Search
CPC .................................. F01D 11/20; F01D 11/24
See application file for complete search history.

(56) References Cited

U.S. PATENT DOCUMENTS

| 4,584,836 | A |   | 4/1986 | McClelland |   |
|---|---|---|---|---|---|
| 4,651,532 | A |   | 3/1987 | Abe |   |
| 8,052,380 | B2 | * | 11/2011 | Willett, Jr. | ............... F01D 5/225 415/114 |
| 8,121,813 | B2 | * | 2/2012 | Ren | .......................... G01B 7/14 702/155 |
| 2010/0104416 | A1 |   | 4/2010 | Willett, Jr. |   |
| 2010/0104427 | A1 |   | 4/2010 | Willett, Jr. |   |
| 2011/0265475 | A1 |   | 11/2011 | Koller |   |
| 2012/0128474 | A1 |   | 5/2012 | Roy et al. |   |
| 2014/0314567 | A1 | * | 10/2014 | Morrison | ................. F01D 11/20 416/1 |
| 2014/0314568 | A1 | * | 10/2014 | Vetters | .................... F01D 11/24 416/1 |
| 2014/0321984 | A1 | * | 10/2014 | Welch | ..................... F01D 11/24 415/139 |

FOREIGN PATENT DOCUMENTS

| EP | 0537307 A1 | 10/1992 |   |
|---|---|---|---|
| FR | 2890685 A1 | * 3/2007 | ............... F01D 11/24 |
| FR | 2943717 A1 | * 10/2010 | ............... F01D 11/025 |

* cited by examiner

*Primary Examiner* — Igor Kershteyn
*Assistant Examiner* — Christopher R Legendre
(74) *Attorney, Agent, or Firm* — Ernest G. Cusick; Hoffman Warnick LLC (57) ABSTRACT

Systems and devices configured for active thermal control of turbine components are disclosed. In one embodiment, a thermal control system for a turbine includes: a thermal source shaped to connect to a turbine; a set of sensors disposed about the turbine and configured to obtain operational data from the turbine; and a computing device communicatively connected to the thermal source and the set of sensors, the computing device configured to regulate a thermal input of the thermal source to the turbine based on the operational data obtained by the set of sensors.

13 Claims, 7 Drawing Sheets

TURBINE THERMAL CLEARANCE MANAGEMENT SYSTEM

FIELD OF THE INVENTION

The subject matter disclosed herein relates to turbines and, more particularly, to systems and devices for providing and improving active thermal clearance management of turbine components and clearances therebetween (e.g., axial clearances, radial clearances, etc.) during turbine operation (e.g., start-up, shut-down, etc.).

BACKGROUND OF THE INVENTION

Some power plant systems, for example certain nuclear, simple cycle and combined cycle power plant systems, employ turbines in their design and operation. Some of these turbines are driven by a flow of high temperature working fluid (e.g., steam, gas, etc.) which is directed over and/or through a series of stages and components (e.g., alternating stationary and rotary airfoils/buckets/blades) within the turbine to generate power. These components and stages may be located at close proximity (e.g., small clearances) relative to one another so as to decrease working fluid leakage through the system and improve turbine efficiency. As a result of the high temperatures of this steam during operation, components (e.g., blades, shells, rotors, etc.) experience a significant increase in temperature, often rising across a temperature range of hundreds of degrees Fahrenheit. This temperature increase may cause the components of the turbine to expand and/or contract during the various operational phases of the turbine. However, component expansion rates may vary depending on component size, orientation, shape, thermal symmetries, etc., and these variances in expansion may require that clearances between the components be incorporated into the design to prevent rubbing of components and damage to the turbine during transient periods of operation (e.g., start-up, cool-down, etc.). These clearances may compensate for the inconsistent uniform bulk section temperatures in components, particularly stationary components such as the shell, which may cause these components to deflect relative to rotating components of the turbine. As a result, these clearances may limit turbine design and steady state operation, reducing turbine efficiency and allowing leakage of steam past turbine components.

BRIEF DESCRIPTION OF THE INVENTION

Systems and devices for active thermal clearance control of turbine components are disclosed. In one embodiment, a thermal control system for a turbine includes: a thermal source shaped to connect to a turbine; a set of sensors disposed about the turbine and configured to obtain operational data from the turbine; and a computing device communicatively connected to the thermal source and the set of sensors, the computing device configured to regulate a thermal input of the thermal source to the turbine based on the operational data obtained by the set of sensors.

A first aspect of the disclosure provides a thermal control system for a turbine including: a thermal source shaped to connect to a turbine; a set of sensors disposed about the turbine and configured to obtain operational data from the turbine; and a computing device communicatively connected to the thermal source and the set of sensors, the computing device configured to regulate a thermal input of the thermal source to the turbine based on the operational data obtained by the set of sensors.

A second aspect provides a power generation system including: a turbine; and at least one computing device communicatively connected to the turbine and configured to thermally manage components of the turbine by performing actions comprising: processing operational data from a set of sensors disposed about the turbine; and regulating an input of a thermal source disposed on the turbine based on the operational data.

A third aspect provides a turbine including: a stator; a working fluid passage substantially surrounded by the stator; a rotor configured radially inboard of the working fluid passage; and a thermal control system disposed about the stator, the thermal control system including: a thermal source shaped to connect to a turbine; a set of sensors disposed about the turbine and configured to obtain operational data from the turbine; and a computing device communicatively connected to the thermal source and the set of sensors, the computing device configured to regulate a thermal input of the thermal source to the turbine based on the operational data obtained by the set of sensors.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not necessarily to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-7, like numbering may represent like elements. Redundant explanation of these elements has been omitted for clarity. Finally, it is understood that the components of FIGS. 1-7 and their accompanying descriptions may be applied to any embodiment described herein.

DETAILED DESCRIPTION OF THE INVENTION

As indicated above, aspects of the invention provide for thermal clearance control systems and devices configured to reduce thermal displacements and/or variations between turbine components, these systems improving turbine clearances and performance by controlling effective shell movements. The system includes a set of thermal sources (e.g., thermal blankets, segmented thermal blankets, heating coils, ceramic resistance heaters, etc.) which are disposed about the turbine and connected to a computing device which includes an active thermal clearance control system which may be manually controlled by a technician or automatically controlled by a computing device. The set of thermal sources are connected to the turbine and are configured to supply a thermal input (e.g., heat) to turbine components in order to control clearances between turbine components. A set of operational sensors (e.g., inner surface thermocouples, outer surface thermocouples, deflection sensors, clearance sensors, etc.) are disposed about the turbine and configured to obtain operational data (e.g., temperatures, clearance values, etc.) for turbine components. During operation a technician and/or the computing device processes operational data obtained from the operational sensors with a predictive model of the turbine and based on this processing controls operation of the thermal sources disposed about the turbine to control/regulate component (e.g., shell) temperatures and expansion rates. As a result, the technician and/or computing device may control overall effective shell movements during start-up and shut-down processes and thereby reduce the required magnitude of clearances within the turbine.

Figure 1:
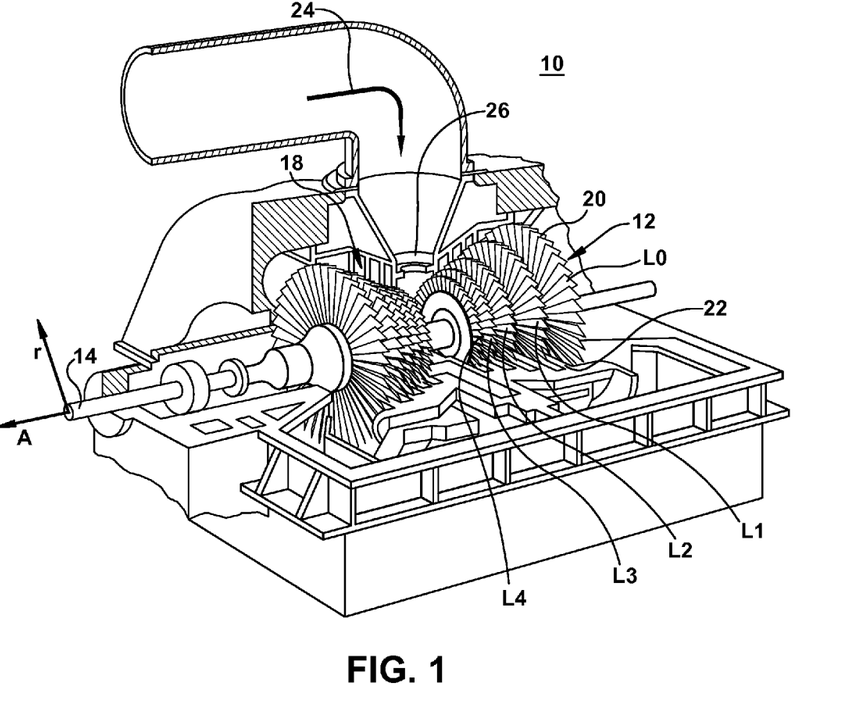
FIG. 1 is a three-dimensional partial cut-away perspective view of a portion of a turbine according to an embodiment of the invention.

As used herein, the directional key in the lower left-hand portion of FIG. 1 is provided for ease of reference. As shown, this key is oriented with respect to the close-up views of portions of turbines described herein. For example, as used in FIGS. 1-7, which show views of turbines, the "r" axis represents vertical (or radial) orientation, and the "A" axis represents axial orientation (along the axis of the turbine rotor).

Turning to the FIGURES, embodiments of systems and devices are shown, which are configured to provide for thermal clearance control systems and devices configured to reduce thermal displacements and/or variations between turbine components, these systems improving turbine clearances and performance. Each of the components in the FIGURES may be connected via conventional means, e.g., via a common conduit or other known means as is indicated in FIGS. 1-7. Referring to the drawings, FIG. 1 shows a perspective partial cut-away illustration of a gas or steam turbine 10. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14, and the vanes are axially positioned between adjacent rows of blades 20. Stationary vanes 22 cooperate with blades 20 to form a stage and to define a portion of a steam flow path through turbine 10.

In operation, gas or steam 24 enters an inlet 26 of turbine 10 and is channeled through stationary vanes 22. Vanes 22 direct gas or steam 24 downstream against blades 20. Gas or steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Figure 2:
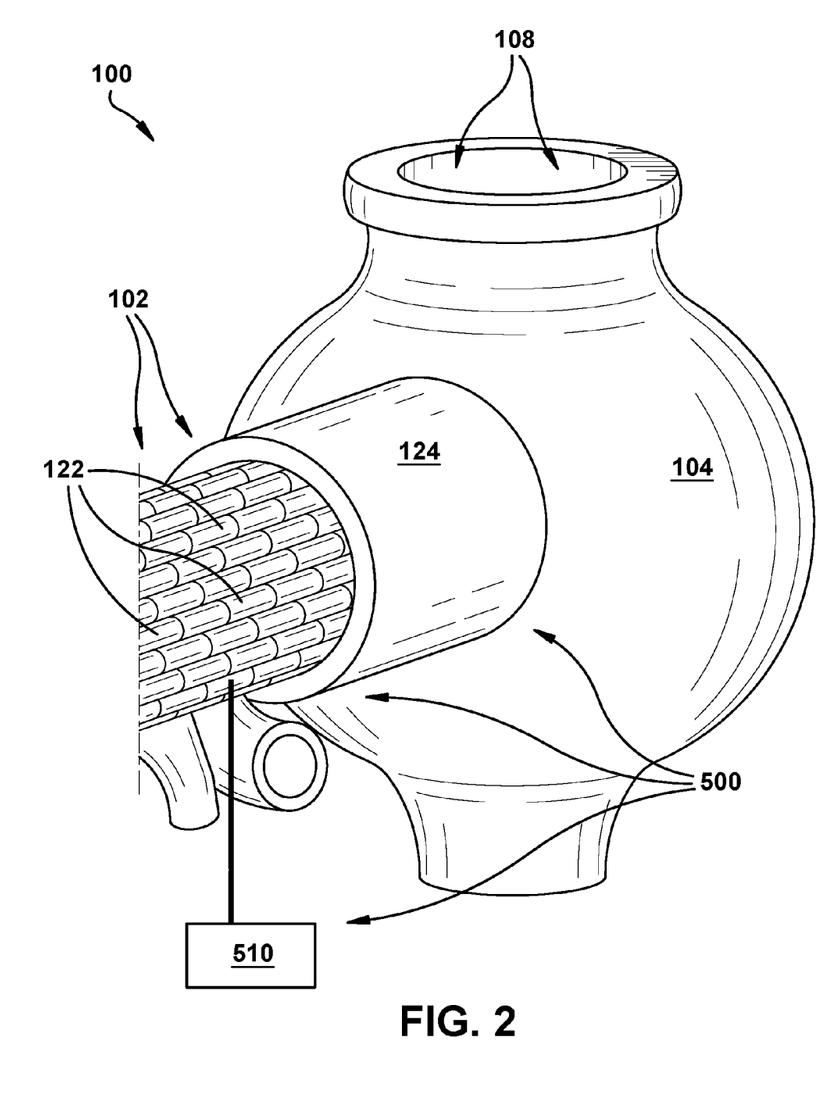
FIG. 2 shows a partial three-dimensional cut-away schematic view of a portion of a turbine according to an embodiment of the invention.

Turning to FIG. 2, a partial cross-sectional view of a thermal clearance control system 500 including a thermal source 122 disposed about a portion of a turbine 100 is shown according to embodiments of the invention. Turbine 100 may include a shell portion 102 (partially shown in FIG. 2) connected to an exhaust bowl 104. Working fluid at varying temperatures may travel through shell portion 102 and exhaust bowl 104 for exhaust through exhaust port 108. As seen in FIG. 2, thermal source 122 (e.g., a thermal blanket, thermal pad, induction coil, ceramic resistance, etc.) may be disposed about shell portion 102 of turbine 100 and may include a plurality of segmented (e.g., independently controlled, thermally independent, etc.) thermal elements (e.g., heating elements, cooling elements etc.). In an embodiment, an insulation layer 124 may be disposed about shell portion 102 and/or thermal source 122. During operation of turbine 100, particularly during transient state operation of turbine 100, thermal source 122 may apply thermal energy to shell portion 102 so as to control thermal and/or spatial variations (e.g., clearances) between shell portion 102 and turbine components (e.g., rotor, blades, inner shell, etc.) exposed to the working fluid flow and disposed within shell portion 102. In an embodiment, a technician may control thermal source 122 and manipulate thermal contributions (e.g., heating) in accordance with operational parameters and/or conditions.

As can be seen in FIG. 2, a computing device 510 may be connected to thermal source 122 and a set of operational sensors 180 (shown in FIG. 3) may be disposed about turbine 100 and inner shell 102. As discussed herein, a technician and/or computing device 510 may control operation and thermal contributions by thermal source 122 to regulate movement, displacement, expansion, and/or clearances of shell portion 102. In an embodiment, a technician may control computing device 510 and thermally control clearances within turbine 100 via computing device 510. During operation computing device 510 may process operational data obtained from operational sensors 180 and control thermal source 122 based on the operational data. In one embodiment, computing device 510 may include a turbine model 517 (e.g., a predictive model/algorithm)(shown in FIG. 5) which may process the operational data to enable active thermal clearance control of turbine 100 (e.g., shell portion 102) based on model predictions. Computing device 510 may actively control a temperature/displacement of shell portion 102 in substantially real-time via thermal source 122, turbine model 517, and/or the operational data. In one embodiment, computing device 510 may be located remote relative to turbine 100 and/or thermal source 122. In another embodiment, a technician may manually control thermal inputs via thermal source 122 based on operational data obtained from set of operational sensors 180. In one embodiment, the technician may monitor set of operational sensors 180 and manipulate operation of thermal source 122 via computing device 510. In another embodiment, the technician may monitor set of operational sensors 180 via computing device 510 and manually manipulate operation of thermal source 122.

In an embodiment, computing device 510 may control clearances within turbine 100 by relating clearance values to shell deflection values and controlling thermal inputs to the shell in accordance with this correlation. Computing device 510 may manipulate thermal inputs from thermal source 122 based on a combination of clearance values and shell deflection values (e.g., as a clearance value is known to be varying via observation of operational data, computing device 510 and/or a technician may manipulate a thermal input from thermal source 122 to effect a comparable/desirable variation in shell deflection values for related components). Thermal source 122 may introduce a thermal input to turbine components, thereby thermally regulating the components and effecting expansion and/or deflection values of the components and orientations/spacing (e.g., clearances) with other components. It is understood that the connection between any of operational sensors 180, computing device 510, thermal source 122 and/or turbine 100 may be wireless, cabled, or any other means now known or later developed.

Figure 3:
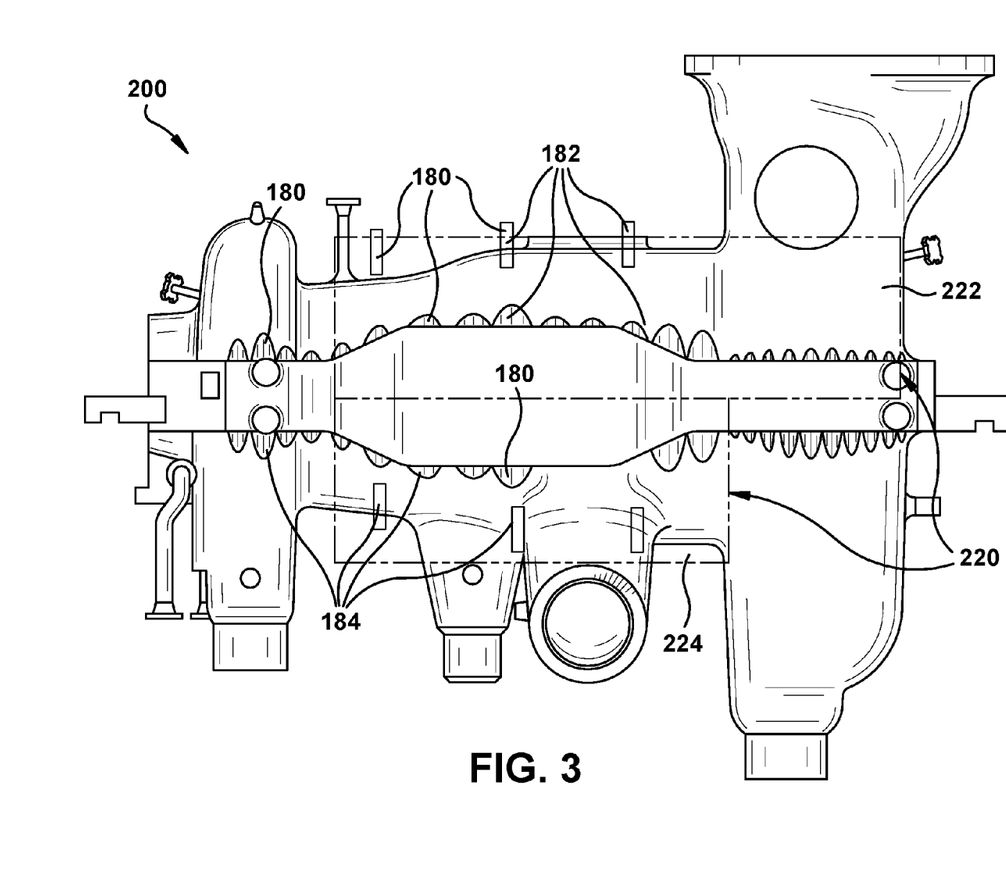
FIG. 3 shows a partial three-dimensional perspective view of a turbine diaphragm system according to an embodiment of the invention.

Turning to FIG. 3, a partial three-dimensional perspective view of an embodiment of an active thermal control system 220 (e.g., a clearance control system) disposed about a turbine 200 is shown. In this embodiment, thermal control system 220 includes a first thermal source 222 (shown in phantom) which is configured/shaped to be disposed about a first portion of the turbine shell (e.g., a stator, an upper half, a lower half, etc.) and a second thermal source 224 (shown in phantom) which is configured/shaped to be disposed about a second portion of the turbine shell (e.g., a stator, an upper half, a lower half, etc.). First thermal source 222 and second thermal source 224 may supply regulated thermal energy to turbine 200 and/or the turbine shell in order to manipulate clearances within turbine 200. In one embodiment, thermal control system 220 may be formed as a uniform component/body (e.g., one element) shaped to be disposed about turbine 200. In another embodiment, turbine control system 220 may be formed as an assembly of a plurality of components (e.g., elements, segmented elements, etc.) which may include any materials now known or later developed. First thermal source 222 and second thermal source 224 may include the same or different heating elements/features (e.g., electrical heating element, hot water heating element, steam heating element, ceramic resistance heating element, etc.) relative to one another.

In an embodiment, thermal control system 220 may include a plurality of operational sensors 180 disposed about turbine 200. Operational sensors 180 may include clearance probes, thermocouples, thermometers, displacement sensors, laser deflection sensors etc. and may be disposed about and/or within turbine 200. In an embodiment, operational sensors 180 may include a first sensor set 182 and a second sensor set 184. First sensor set 182 may be disposed proximate first thermal source 222 (e.g., on a top portion of turbine 200) to monitor temperatures and displacements of the turbine shell effected by first thermal source 222 and second sensor set 184 may be disposed proximate second thermal source 224 (e.g., on a bottom portion of turbine 200) to monitor temperatures and displacements of the turbine shell effected by second thermal source 224. It is understood that while thermal control system 220 is shown including a first thermal source 222 and a second thermal source 224, that any number and/or configuration of thermal sources now known or later developed may be used in accordance with the invention.

Figure 4:
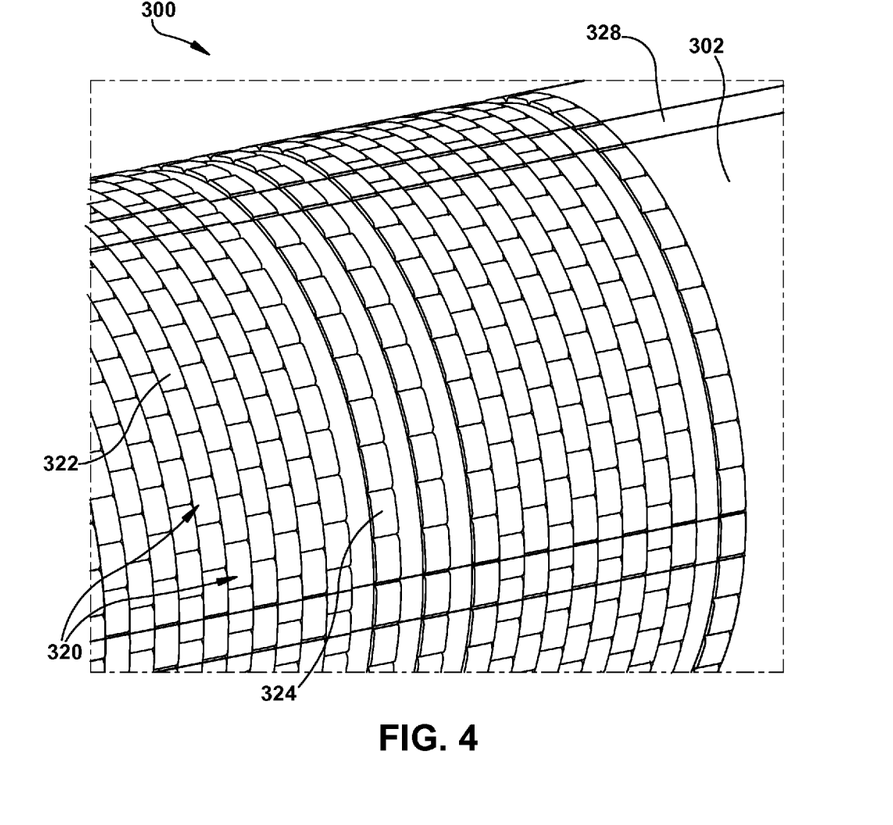
FIG. 4 shows a three-dimensional perspective view of a portion of a turbine according to an embodiment of the invention.

Turning to FIG. 4, a partial three-dimensional perspective view of a portion of a thermal source 320 disposed about a shell 302 of a turbine 300 is shown according to an embodiment of the invention. In this embodiment, thermal source 320 includes a plurality of segmented thermal sources including first thermal segment source 322, second thermal segment source 324, and third thermal segment source 328. Plurality of segmented thermal sources 322, 324, and 328, may be independent relative to one another and may make different and/or varied thermal contributions to turbine 300 based on directions from a technician and/or computing device 510. As can be seen in FIG. 4, the plurality of segmented thermal sources 322, 324, and 328, may be disposed about shell portion 302 in a variety of patterns and configurations and may be located proximate or distant relative to one another. In an embodiment, first thermal segment source 322 and second thermal segment source 324 may be located proximate relative to one another on shell portion 302 and distant relative to third thermal segment source 328 on shell portion 302. This configuration may enable increased response/thermal clearance control in areas of shell portion 302 and decreased response in other areas of shell portion 302. In an embodiment, the plurality of segmented thermal sources 322, 324, and 328, may enhance active thermal clearance control between components of turbine 100 by allowing thermal contributions which are more precise to a given section's thermal bulk.

Figure 5:
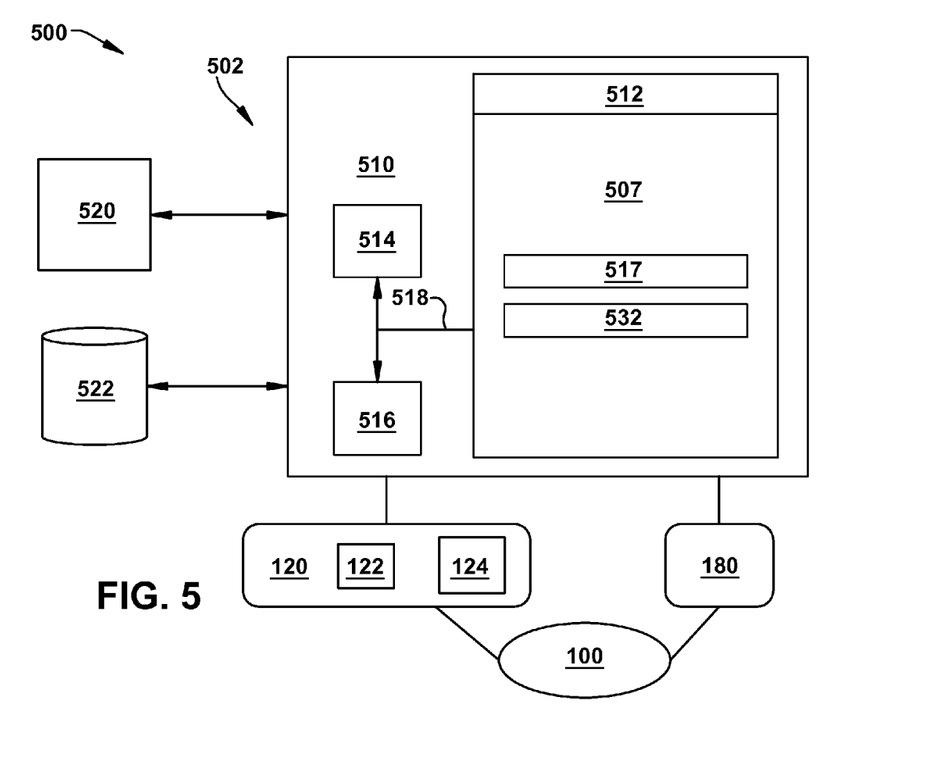
FIG. 5 shows a schematic illustration of an environment including a control system in accordance with an embodiment of the invention.

Turning to FIG. 5, a thermal clearance control system 500 is shown including set of thermal sources 120 connected to a computing device 510 and a turbine 100 according to embodiments of the invention. Thermal clearance control system 500 includes a computer infrastructure 502 that can perform the various processes described herein. In particular, computer infrastructure 502 is shown including computing device 510 which includes a thermal clearance management system 507, which enables computing device 510 to analyze and/or predict conditions (e.g., clearances, displacements, temperatures, movements, etc.) of portions of turbine 100 (e.g., joints, shells, surfaces, conduits, etc.) by performing the process steps of the disclosure. In one embodiment, computing device 510 may determine a clearance gap between components of turbine 100, anticipate changes in the dimension of the clearance gap during turbine operation and/or temperature adjustments, and/or manipulate a temperature of components of turbine 100 via set of thermal sources 120. Thermal clearance control system 500 may be operated manually by a technician, automatically by computing device 510, and/or in conjunction with a technician and computing device 510.

As previously mentioned and discussed further below, thermal clearance management system 507 has the technical effect of enabling computing device 510 to perform, among other things, the clearance monitoring, adjustment and/or regulation described herein. It is understood that some of the various components shown in FIG. 5 can be implemented independently, combined, and/or stored in memory for one or more separate computing devices that are included in computing device 510. Further, it is understood that some of the components and/or functionality may not be implemented, or additional schemas and/or functionality may be included as part of thermal management system 507.

Computing device 510 is shown including a memory 512, a processor unit (PU) 514, an input/output (I/O) interface 516, and a bus 518. Further, computing device 510 is shown in communication with an external I/O device/resource 520 and a storage system 522. As is known in the art, in general, PU 514 executes computer program code, such as thermal management system 507, that is stored in memory 512 and/or storage system 522. While executing computer program code, PU 514 can read and/or write data, such as graphical user interface 530 and/or operational data 532, to/from memory 512, storage system 522, and/or I/O interface 516. Bus 518 provides a communications link between each of the components in computing device 510. I/O device 520 can comprise any device that enables a user to interact with computing device 510 or any device that enables computing device 510 to communicate with one or more other computing devices. Input/output devices (including but not limited to keyboards, displays, pointing devices, etc.) can be coupled to the system either directly or through intervening I/O controllers.

In some embodiments, as shown in FIG. 5, thermal clearance control system 500 may include set of operational sensors 180 connected to turbine 100 and communicatively connected to computing device 510 (e.g., via wireless or hard-wired means). Operational sensors 180 may obtain a set of operational data 532 (e.g., component temperatures, component displacements, working fluid temperatures, etc.) and transmit operational data 532 to computing device 510 for processing with thermal clearance management system 507 and/or a predictive turbine model 517 as a part of regulation/manipulation of set of thermal sources 120. In an embodiment, computing device 510 may control clearances (e.g., shell deflections, minimize shell deflections, etc.) within turbine 100 by processing operational data 532 and adjusting an operational state (e.g., temperature range, thermal input, etc.) of set of thermal sources 120 based in part on predictive turbine model 517. In one embodiment, operational sensors 180 may include thermocouples which may provide operational data 532 to computing device 510 as feedback for predictive turbine model 517 and/or thermal clearance management system 507. In one embodiment, thermal clearance management system 507 may control a set of thermal sources 120, which can include one or more thermal source 122 and/or insulation layer 124, disposed about turbine 100, and manipulate clearances within turbine 100 via thermal contributions from set of thermal sources 120, including one or more thermal source 122 and/or insulation layer 124.

In any event, computing device 510 can comprise any general purpose computing article of manufacture capable of executing computer program code installed by a user (e.g., a personal computer, server, handheld device, etc.). However, it is understood that computing device 510 is only representative of various possible equivalent computing devices and/or technicians that may perform the various process steps of the disclosure. To this extent, in other embodiments, computing device 510 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 510 may be/include a distributed control system.

Figure 6:
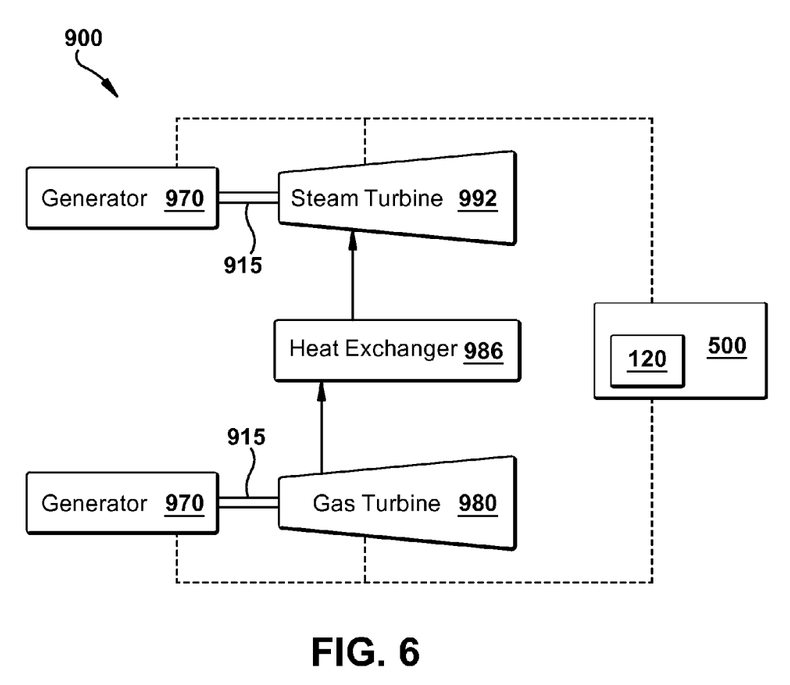
FIG. 6 shows a schematic block diagram illustrating portions of a combined cycle power plant system according to embodiments of the invention.
Figure 7:
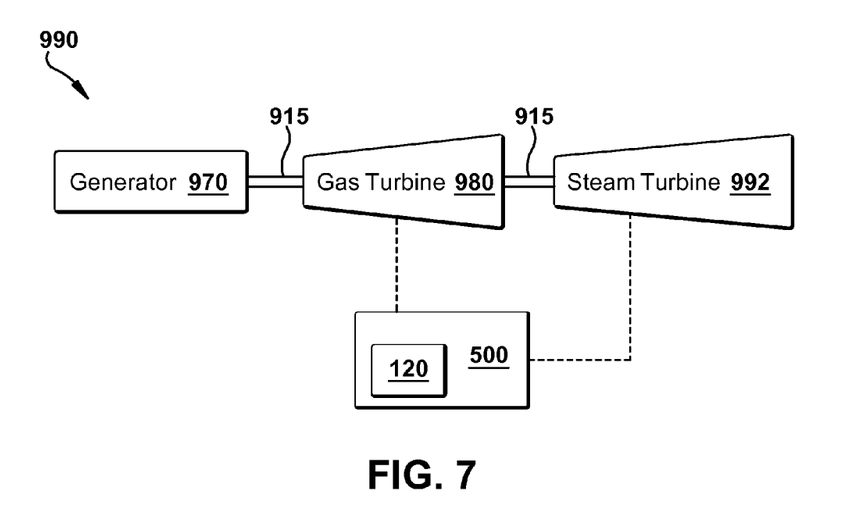
FIG. 7 shows a schematic block diagram illustrating portions of a single-shaft combined cycle power plant system according to embodiments of the invention.

Turning to FIG. 6, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 6 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may be connected to thermal clearance control system 500 of FIG. 2 or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 7, a single shaft combined cycle power plant 990 may include a single generator 970 coupled to both gas turbine 980 and steam turbine 992 via a single shaft 915. Steam turbine 992 and/or gas turbine 980 may be connected to thermal clearance control system 500 of FIG. 2 or other embodiments described herein.

The systems and devices of the present disclosure are not limited to any one particular turbine, power generation system or other system, and may be used with other power generation systems and/or systems (e.g., combined cycle, simple cycle, nuclear reactor, etc.). Additionally, the systems and devices of the present invention may be used with other systems not described herein that may benefit from the thermal management and control of the systems and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal control system for a turbine, the thermal control system comprising:
   a thermal source in thermal communication with a portion of a turbine;
   a set of sensors disposed about the turbine and configured to obtain operational data from the turbine; and
   a computing device communicatively connected to the thermal source and the set of sensors, wherein the computing device regulates a thermal input from the thermal source to the turbine by performing actions including:
      generating a predictive model of the turbine based on the operational data obtained by the set of sensors, wherein the predictive model relates the operational data to at least one thermal attribute of the turbine, the at least one thermal attribute including a clearance between components and a thermal deflection in the portion of the turbine, predicting a value of the at least one thermal attribute in the portion of the turbine at an adjusted temperature using the predictive model, and adjusting the thermal input from the thermal source to yield the adjusted temperature and the predicted value of the at least one thermal attribute in the portion of the turbine.

2. The thermal control system of claim 1, wherein the thermal source includes a plurality of segmented thermal components.

3. The thermal control system of claim 1, wherein the thermal source includes at least one of: a thermal blanket, a thermal pad, a ceramic resistance pad, or an electric heating element.

4. The thermal control system of claim 1, wherein the set of sensors include at least one of: a thermocouple, a clearance probe, or a deflection sensor.

5. The thermal control system of claim 1, wherein the computing device is further configured to regulate the thermal input by cooling of the turbine and heating the turbine while adjusting the thermal input from the thermal source.

6. The thermal control system of claim 1, wherein the predictive model generated in the computing device is further relates the operational data to each of the clearance between components and the thermal deflection in the portion of the turbine.

7. A power generation system comprising:

a turbine;

a thermal source in thermal communication with a portion of the turbine; and at least one computing device communicatively connected to the turbine and the thermal source, wherein the at least one computing device to thermally manages clearances between components of the turbine by performing actions including:

processing operational data from a set of sensors disposed about the turbine, generating a predictive model of the turbine based on the processed operational data, wherein the predictive model relates the operational data to at least one clearance between components in the portion of the turbine, predicting a value of the at least one clearance between components in the portion of the turbine at an adjusted temperature using the predictive model, and adjusting an input of the thermal source to yield the adjusted temperature and the predicted value of the at least one clearance between components in the portion of the turbine.

8. The power generation system of claim 7, wherein the thermal source includes a plurality of segmented thermal components.

9. The power generation system of claim 7, wherein the at least one computing device further controls the thermal source to cool of the turbine and heat the turbine while adjusting the thermal input from the thermal source.

10. The power generation system of claim 7, wherein the set of sensors include at least one of: a thermocouple, a clearance probe, or a deflection sensor.

11. A turbine, comprising:

a stator;

a working fluid passage substantially surrounded by the stator;

a rotor configured radially inboard of the working fluid passage; and a thermal control system disposed about the stator, the thermal control system including:

a set of sensors disposed about the turbine and configured to obtain operational data from the turbine;

a thermal source shaped to connect to the stator and in thermal communication with a portion of the turbine; and a computing device communicatively connected to the thermal source, wherein the computing device thermally manages clearances between components of the turbine by performing actions including:

processing operational data from the set of sensors;

generating a predictive model of the turbine based on the processed operational data, wherein the predictive model relates the operational data to at least one thermal attribute of the turbine, the at least one thermal attribute including a clearance between components in the portion of the turbine and a thermal deflection in the portion of the turbine, predicting a value of the at least one thermal attribute in the portion of the turbine at an adjusted temperature using the predictive model, and adjusting an input of the thermal source to yield the adjusted temperature and the predicted value of the at least one thermal attribute in the portion of the turbine.

12. The turbine of claim 11, wherein the thermal source includes a plurality of segmented thermal components.

13. The turbine of claim 11, wherein the computing device is further configured to generate the predictive model of the turbine such that the predictive model relates the operational data to each of the clearance between components and the thermal deflection in the portion of the turbine.

\* \* \* \* \*